（12）United States Patent
Hasejima et al.

(10) Patent No.: US 11,407,406 B2
(45) Date of Patent: *Aug. 9, 2022

(54) PARKING ASSISTANCE DEVICE

(71) Applicant: CLARION CO., LTD., Saitama (JP)

(72) Inventors: Noriyasu Hasejima, Tokyo (JP); Shinya Tagawa, Saitama (JP)

(73) Assignee: CLARION CO., LTD., Saitama (JP)

( * ) Notice: Subject to any disclaimer, the term of this patent is extended or adjusted under 35 U.S.C. 154(b) by 241 days.

This patent is subject to a terminal disclaimer.

(21) Appl. No.: 16/744,959

(22) Filed: Jan. 16, 2020

(65) Prior Publication Data

US 2020/0148199 A1 May 14, 2020

Related U.S. Application Data

(63) Continuation of application No. 15/770,672, filed as application No. PCT/JP2016/075466 on Aug. 31, 2016, now Pat. No. 10,562,525.

(30) Foreign Application Priority Data

Oct. 27, 2015 (JP) .................................. 2015-211322

(51) Int. Cl.
*B60W 30/06* (2006.01)
*G05D 1/02* (2020.01)
(Continued)

(52) U.S. Cl.
CPC ............. *B60W 30/06* (2013.01); *B60R 21/00* (2013.01); *B62D 15/027* (2013.01);
(Continued)

(58) Field of Classification Search
CPC ...... B60W 30/06; B60R 21/00; B62D 15/027; B62D 15/028; B62D 15/0285; G05D 1/0212; G08G 1/16
See application file for complete search history.

(56) References Cited

U.S. PATENT DOCUMENTS

2010/0219010 A1* 9/2010 Kadowaki .......... B62D 15/0285
180/204
2015/0258989 A1* 9/2015 Okano ................. B62D 15/028
701/1

FOREIGN PATENT DOCUMENTS

EP 2620351 A2 7/2013
JP 2005-014738 A 1/2005
(Continued)

OTHER PUBLICATIONS

International Search Report for WO 2017/073159 A1, dated Nov. 8, 2016.

(Continued)

*Primary Examiner* — Brian P Sweeney
(74) *Attorney, Agent, or Firm* — Volpe Koenig

(57) ABSTRACT

A parking assist device according to the present invention includes a backward-direction-path calculation unit that calculates a backward-direction path for taking an own vehicle out from a target parking position B based on constraint conditions of a parking space and an own-vehicle behavior, a connection-candidate-position storage unit that sets a plurality of connection candidate positions D on the backward-direction path, a forward-direction-path calculation unit that calculates a forward-direction path leadable to one of the connection candidate positions D from a current position A of the own vehicle, and a parking-path setting unit that sets a parking path by combining the backward-direction path and the forward-direction path.

5 Claims, 16 Drawing Sheets

(51) Int. Cl.
  *B62D 15/02*   (2006.01)
  *B60R 21/00*   (2006.01)
  *G08G 1/16*    (2006.01)

(52) U.S. Cl.
  CPC ......... *B62D 15/028* (2013.01); *G05D 1/0212* (2013.01); *G08G 1/16* (2013.01)

(56) References Cited

FOREIGN PATENT DOCUMENTS

| | | |
|---|---|---|
| JP | 2006-312440 A | 11/2006 |
| JP | 2006-347460 A | 12/2006 |
| JP | 2010-202010 A | 9/2010 |
| JP | 2010-208392 A | 9/2010 |
| JP | 2014-189097 A | 10/2014 |
| WO | 2009/044513 A1 | 4/2009 |

OTHER PUBLICATIONS

Extended European Search Report dated May 22, 2019 for the European Patent Application No. 16859396.0.
Japanese Office Action dated Feb. 5, 2019 for the Japanese Patent Application No. 2015-211322.
Extended European Search Report dated Jan. 28, 2021 for European Patent Application No. 20191391.0.

* cited by examiner

PARKING ASSISTANCE DEVICE

CROSS REFERENCE TO RELATED APPLICATION(S)

This application is a continuation of U.S. patent application Ser. No. 15/770,672, filed Apr. 24, 2018, which claims priority to JP Patent Application No. 2015-211322 filed on Oct. 27, 2015 and PCT/JP2016/075466 filed on Aug. 31, 2016, which is/are incorporated by reference as if fully set forth.

TECHNICAL FIELD

The present invention relates to a parking assist device for vehicles.

BACKGROUND ART

PTL 1 discloses a technique of a parking assist device that calculates a guide path including turns to park a vehicle and assists the vehicle to reach a target position along the guide path.

CITATION LIST

Patent Literature

PTL 1: JP 2010-208392 A

SUMMARY OF INVENTION

Technical Problem

In the technique disclosed in PTL 1, since a guide path is calculated based on the positional relation between an initial position at which parking assistance is started and a target parking position and the relation of a vehicle posture, it is impossible to perform parking assistance in the case of, for example, a place where the target parking position cannot be guided from the initial position of the vehicle.

The present invention has been made in view of the above, and is to provide a parking assist device that calculates a parking path including turns for guiding a vehicle to a target parking position without depending on an initial position at which parking assist is started and on a vehicle posture, and to park the vehicle at a parking position desired by a driver with a proper vehicle posture.

Solution to Problem

A parking assist device according to the present invention for solving the above problem is a parking assist device that calculates a parking path from a current position of an own vehicle to a target parking position, the parking assist device including a backward-direction-path calculation unit that calculates a backward-direction path for taking the own vehicle out from the target parking position based on constraint conditions of a parking space and an own-vehicle behavior, a connection-candidate-position storage unit that sets a plurality of connection candidate positions on the backward-direction path, a forward-direction-path calculation unit that calculates a forward-direction path leadable to one of the plurality of connection candidate positions from the current position of the own vehicle, and a parking-path setting unit that sets the parking path by combining the backward-direction path and the forward-direction path.

Advantageous Effects of Invention

According to the present invention, it is possible to calculate a parking path including turns for guiding a vehicle to a target parking position without depending on an initial position at which parking assist is started and on a vehicle posture, and to park the vehicle at a parking position desired by a driver with a proper vehicle posture. Note that, problems, configurations, and effects other than those described above will be clarified from the following description of an embodiment.

DESCRIPTION OF EMBODIMENTS

Next, an embodiment of the present invention will be described with reference to the drawings.

Figure 1:
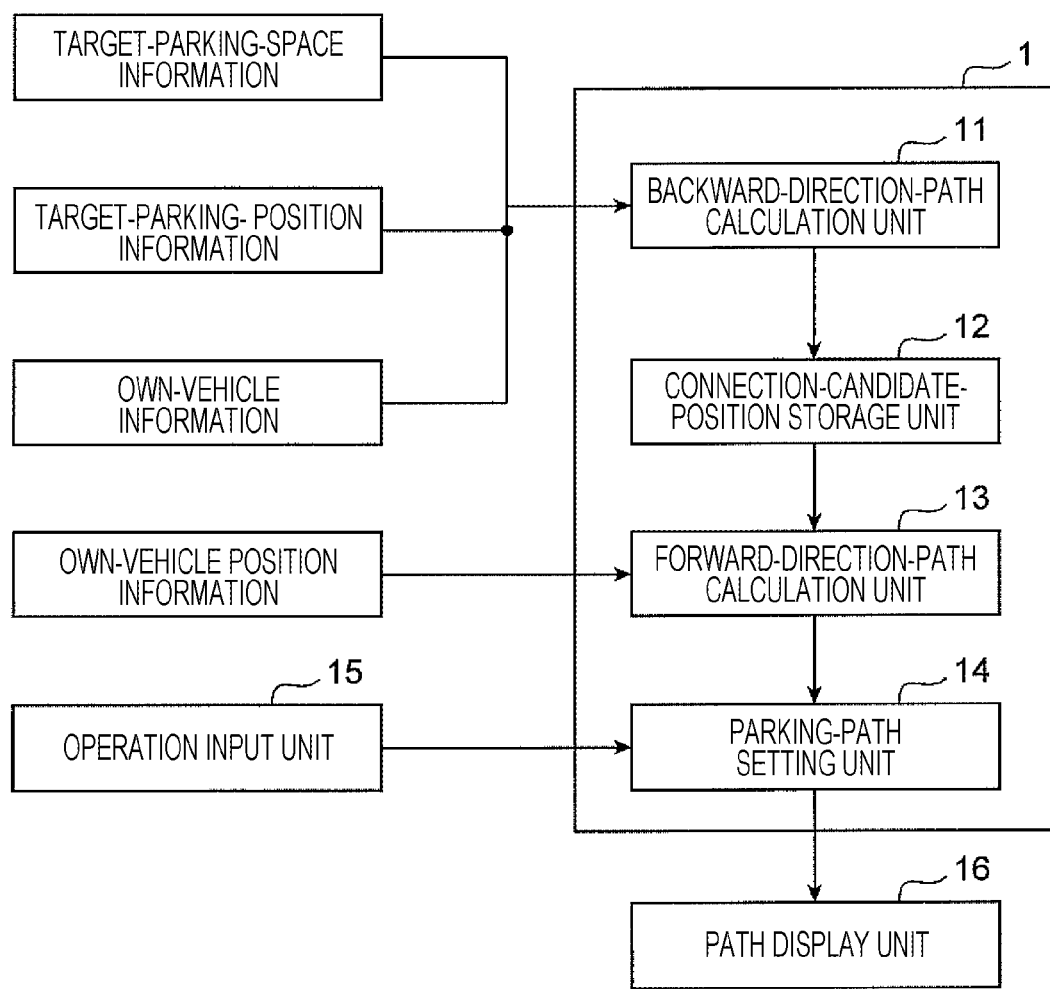
FIG. 1 is a functional block diagram of a parking assist device according to an embodiment of the present invention.

FIG. 1 is a functional block diagram of a parking assist device according to an embodiment of the present invention.

A parking assist device 1 of the present invention is to calculate a parking path for guiding an own vehicle from a current position of the own vehicle to a target parking position and to assist parking so that the own vehicle moves along the calculated parking path, and is suitable for assisting parking operation especially in a narrow space where turns are required twice or more.

The parking assist device 1 includes a backward-direction-path calculation unit 11 that calculates a backward-direction path for taking an own vehicle out from a target parking position based on constraint conditions of a parking space and an own-vehicle behavior, a connection-candidate-position storage unit 12 that sets a plurality of connection candidate positions on the backward-direction path, a forward-direction-path calculation unit 13 that calculates a forward-direction path leadable to one of the plurality of connection candidate positions from the current position of the own vehicle, and a parking-path setting unit 14 that sets a parking path by combining the backward-direction path and the forward-direction path.

As shown in FIG. 1, target-parking-space information, target-parking-position information, and own-vehicle information are input to the backward-direction-path calculation unit 11. The target-parking-space information includes information that is a constraint condition of the parking space, such as the distances to the surrounding walls and other vehicles, the target-parking-position information includes information such as the shape of the target parking position and the relative position to the own vehicle, and the own-vehicle information includes information that is a constraint condition of the own-vehicle behavior such as a turning radius of the own vehicle.

Own-vehicle position information is input to the forward-direction-path calculation unit 13. Information from an operation input unit 15, such as a parking frame selected by a user from a plurality of parking frames, is input to the parking-path setting unit 14. A path display unit 16 is an in-vehicle monitor that a driver can see in a vehicle, and can display a parking path by superimposing it on an image from a camera. The driver can park the vehicle at the target parking position by operating the vehicle according to the parking path displayed on the in-vehicle monitor. Alternatively, the parking assist device 1 may output information on a parking path and automatically operate and park the vehicle at the target parking position.

<Backward-Direction-Path Calculation Unit>

The backward-direction-path calculation unit 11 calculates a backward-direction path based on target-parking-space information such as obstacles around a parking frame, target-parking-position information such as the shape and position of the parking frame, and own-vehicle information on a vehicle specification such as the size of an own vehicle and the minimum turning radius. The target-parking-space information can be acquired from, for example, a detection signal of an ultrasonic sensor mounted on the own vehicle or an image from an in-vehicle camera. Alternatively, infrastructure information of a parking lot may be acquired.

The backward-direction path is a virtual movement path which is an estimated path for taking the own vehicle out from a target parking position at which the own vehicle is parked. The backward-direction path is calculated completely irrelevantly to the current position of the own vehicle. The backward-direction path includes a plurality of turn positions at which the own vehicle is switched back and forth.

The backward-direction path is calculated based on the constraint conditions of the parking space and the own-vehicle behavior. In backward parallel parking, a path assuming that the own vehicle is took out in the same direction as the direction of the own vehicle at the current position when the target parking position is set as the origin is generated. In forward parallel parking, a backward-direction path assuming that the own vehicle is took out in the direction opposite to the direction of the own vehicle at the current position when the target parking position is set as the origin.

For example, in the case of backward parallel parking in which the posture of a vehicle at the target parking position is directed backward, a path to a point at which a reference point, which is the intermediate position between the left and right rear wheels of the vehicle (hereinafter, referred to as a reference point), gets out of the parking frame by moving the vehicle straight forward from the target parking position, an forward path for the own vehicle to reach a reachable limit position with respect to a front obstacle by steering so as to take the vehicle out in the same direction as the direction of the own vehicle at the current position and moving forward, and a backward path for the own vehicle to reach a reachable limit position with respect to a rear obstacle by straightening the front wheels with respect to the own vehicle and moving backward are calculated. Then, the calculation of the backward-direction path for which the forward path and the backward path are alternately calculated is performed until a predetermined termination condition is satisfied. The reachable limit position means a position separated from an obstacle with a predetermined gap therebetween. The predetermined gap has a margin taking an error or the like into consideration so as not to contact with the obstacle, is preferably to be smaller, and set to, for example, about 1 cm to 50 cm.

On the other hand, in the case of forward parallel parking in which the posture of the own vehicle at the target parking position is directed forward, a path to the point at which the reference point is separated from the parking frame by a predetermined distance by moving the vehicle straight backward from the target parking position, a backward path for the own vehicle to reach to a reachable limit position with respect to a rear obstacle by steering so as to take the vehicle out in the opposite direction to the direction of the own vehicle at the current position and moving backward, and a forward path for the own vehicle to reach a reachable limit position with respect to a front obstacle by straightening the front wheels with respect to the own vehicle and moving forward are calculated. Then, the calculation of the backward-direction path for which the forward path and the backward path are alternately calculated is performed until a predetermined termination condition is satisfied.

The backward-direction-path calculation unit 11 calculates a backward-direction path until, as a predetermined termination condition, for example, at least one of a first condition that the direction of the own vehicle on the backward-direction path is 90 degrees with respect to the direction of the own vehicle at the target parking position, a second condition that the own vehicle reaches a point separated laterally by a predetermined distance Hmax from the target parking position, and a third condition that the number of turns on the backward-direction path reaches a predetermined number is satisfied.

Figure 2:
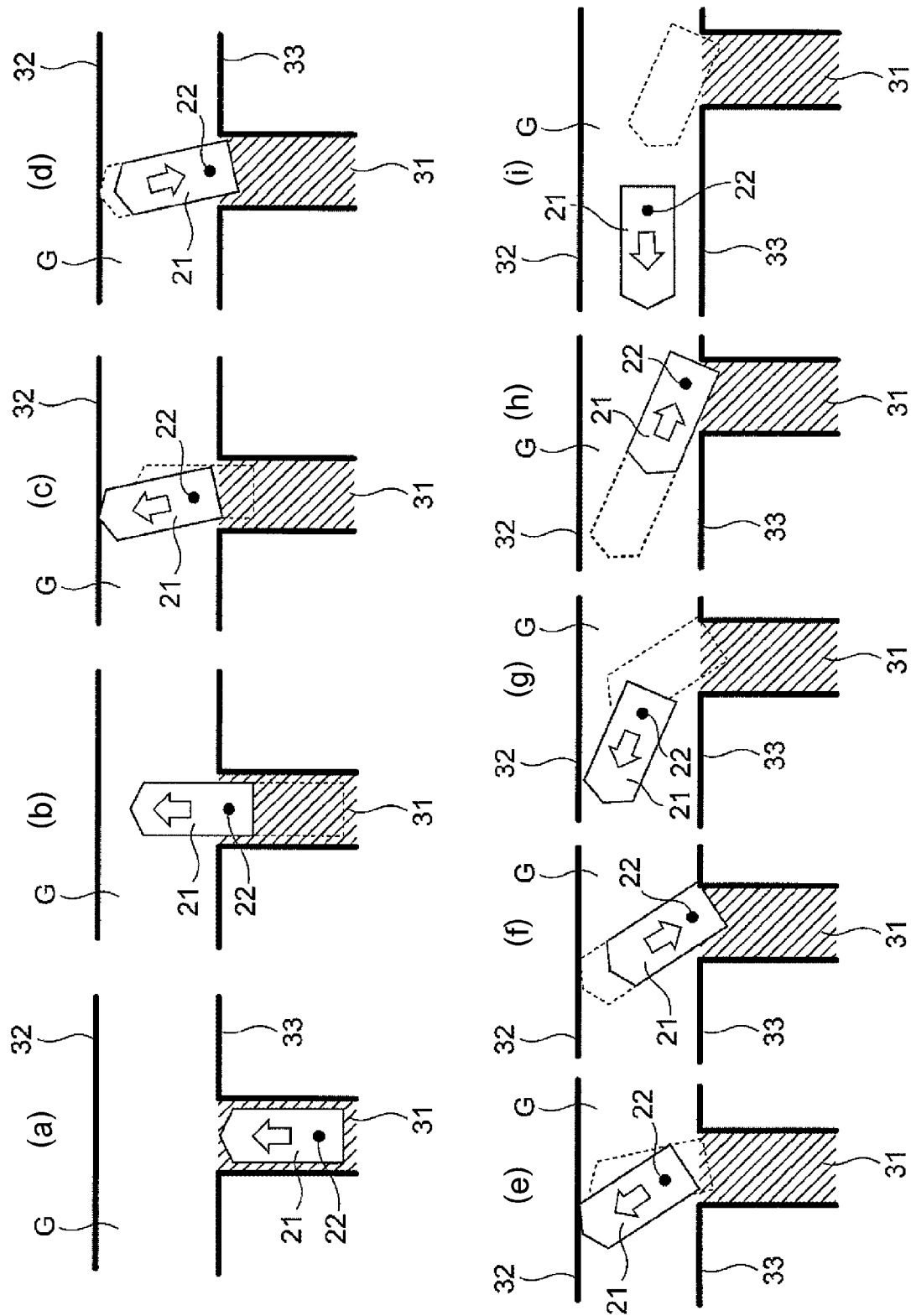
FIG. 2 is a diagram showing an example of a method for calculating a backward-direction path for backward parallel parking.
Figure 3:
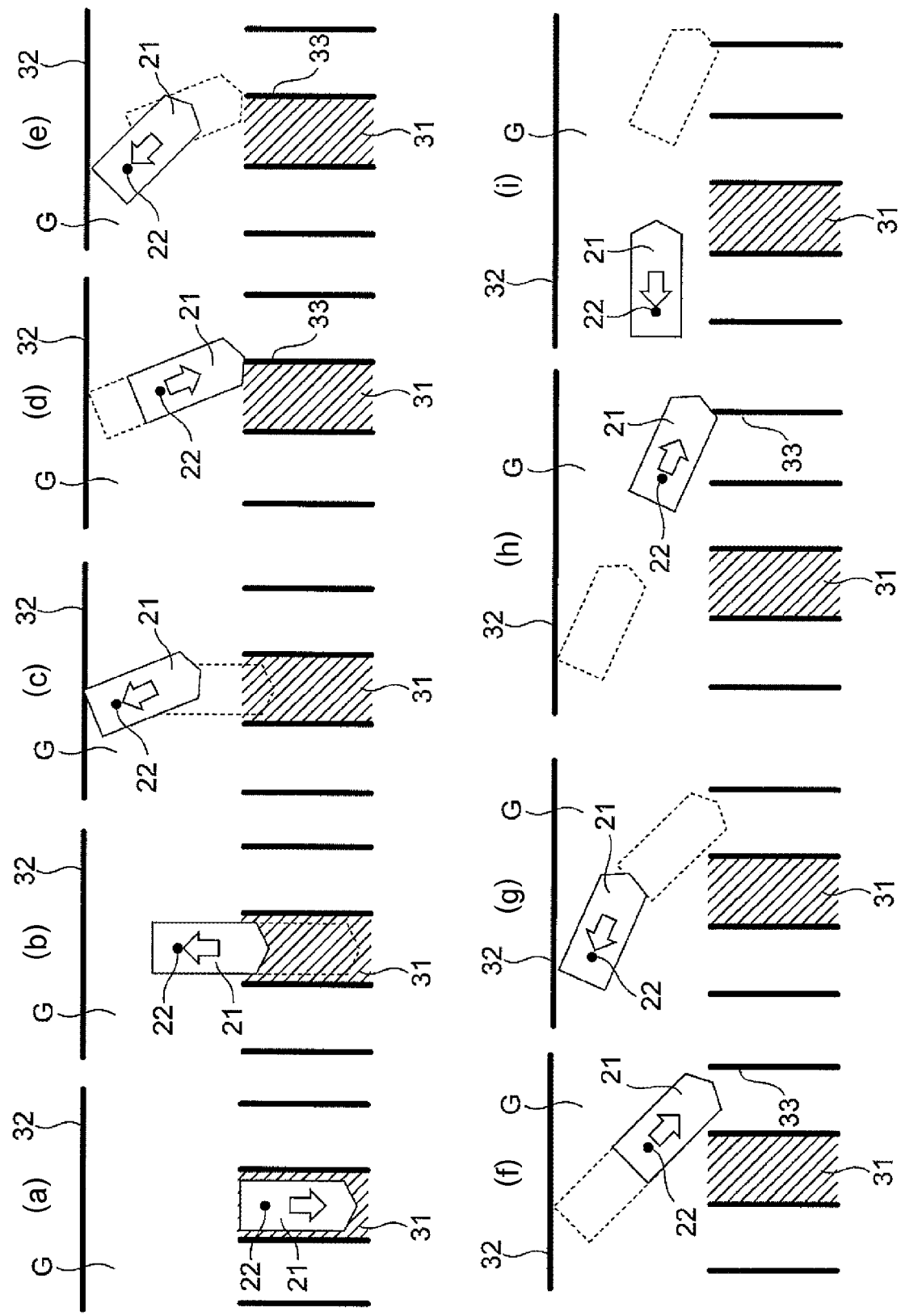
FIG. 3 is a diagram showing an example of a method for calculating a backward-direction path for forward parallel parking.

FIGS. 2 and 3 are diagrams showing an example of a method for calculating a backward-direction path of a vehicle in accordance with preset conditions; FIG. 2 shows a case of backward parallel parking, and FIG. 3 shows a case of forward parallel parking.

In the backward-direction path, in the example of the backward parallel parking shown in FIG. 2, an own vehicle 21 is moved straight forward from a state (a) in which the own vehicle 21 is parked at the target parking position in a parking frame S, a reference point 22 of the own vehicle 21 gets out the parking frame S (b), the own vehicle 21 reaches a reachable limit position with respect to a front obstacle 32 by steering to the left and moving forward (c), and the own vehicle 21 reaches a reachable limit position with respect to a rear obstacle 33 by straightening the front wheels with respect to the own vehicle at the position and moving backward (d). Then, the path through the forward path by steering to the left (e), the backward path by moving straight backward (f), the forward path by steering to the left (g), and the backward path by moving straight backward (h), to the state (i) in which the direction of the own vehicle 21 is 90 degrees with respect to the direction of the own vehicle 21 at the target parking position is calculated.

Similarly, in the example of the forward parallel parking shown in FIG. 3, the own vehicle 21 is moved straight backward from the state (a) in which the own vehicle 21 is parked at the target parking position in the parking frame S, the reference point 22 of the own vehicle 21 gets out the parking frame 31 and reach a position separated from a parking frame 31 (*b*), the own vehicle 21 reaches the reachable limit position with respect to the rear obstacle 32 by steering to the right and moving backward (c), and the own vehicle 21 reaches the reachable limit position with respect to the front obstacle 33 by straightening the front wheels with respect to the own vehicle 21 at the position and moving forward (d). Then, the path through the backward path by steering to the right (e), the forward path by moving straight forward (f), the backward path by steering to the right (g), and the forward path by moving straight forward (h), to the state (i) in which the direction of the own vehicle is 90 degrees with respect to the direction of the own vehicle 21 at the target parking position is calculated.

Note that, the method for calculating the backward-direction path is not limited only to the above method, and the calculation may be performed according to other conditions. Alternatively, the calculation may be performed by selecting a condition suitable for the target parking space from a plurality of preset conditions.

<Connection-Candidate-Position Storage Unit>

The connection-candidate-position storage unit 12 sets a plurality of connection candidate lines PL at predetermined intervals on a passage G, and stores positions at which the reference point 22 of the own vehicle 21 crosses these connection candidate lines PL on the backward-direction path and the directions of the own vehicle 21 at the positions as connection candidate positions D.

Figure 4:
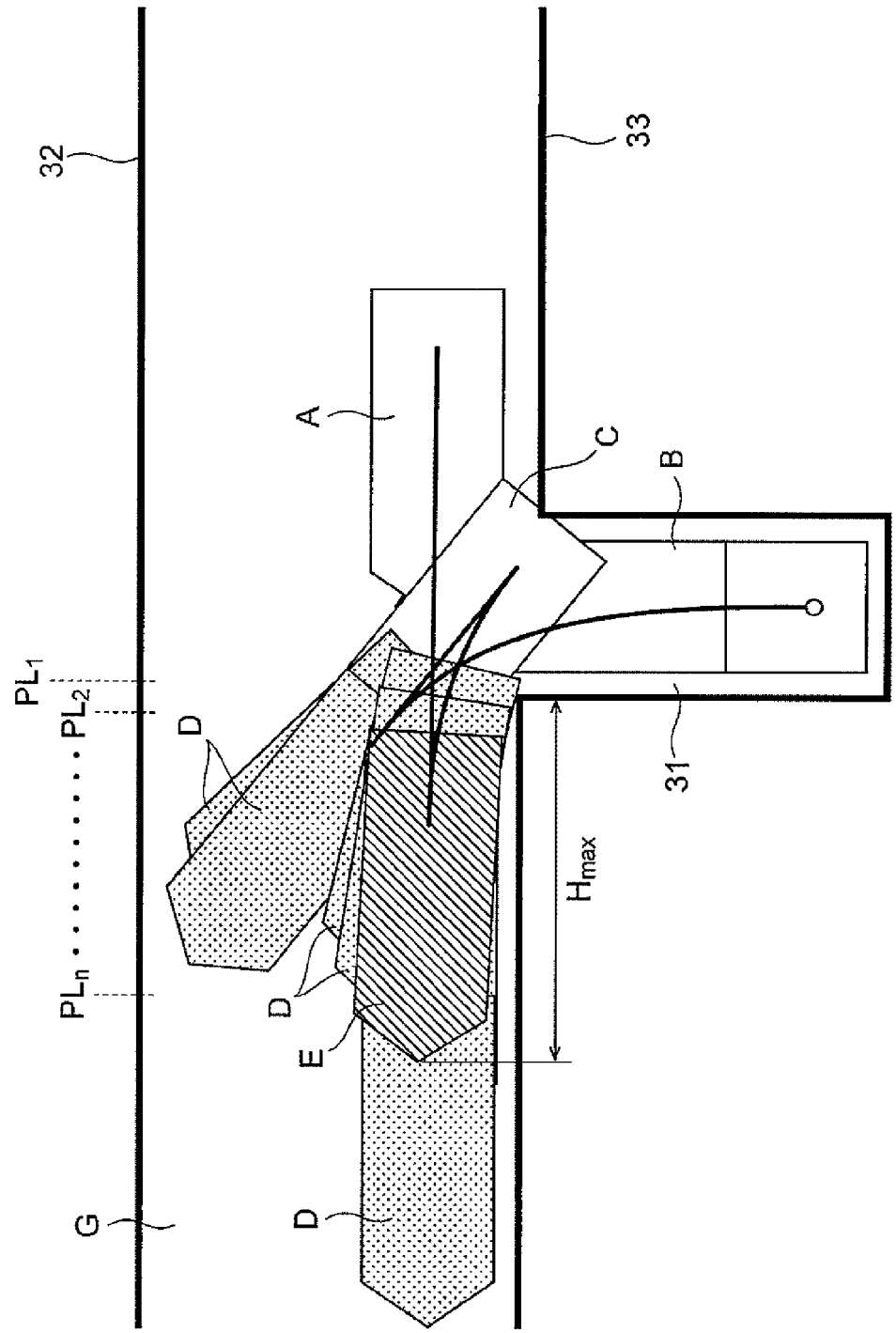
FIG. 4 is a diagram showing connection candidate positions on a backward-direction path in the case of backward parallel parking.

FIG. 4 is a diagram showing connection candidate positions on a backward-direction path in the case of backward parallel parking.

The connection candidate lines PLn (n is a numeral) are set so as to extend in the direction of the width of the passage G in front of the target parking position B, and are set in the left direction from the parking frame 31 on the passage G at predetermined intervals. In the present embodiment, the connection candidate lines PLn are set from 1.5 m in the lateral direction setting the target parking position B as a reference at intervals of 0.5 m. In addition, information on the positions at which the reference point 22 passes through the connection candidate lines PL on the backward-direction path, and on the directions of the own vehicle at the positions is stored as a connection candidate position D. In the drawing, the reference sign A indicates the current position, the reference sign B indicates the parking target position, the reference sign C indicates the reachable limit position, and the reference sign E indicates the reaching position.

Figure 5:
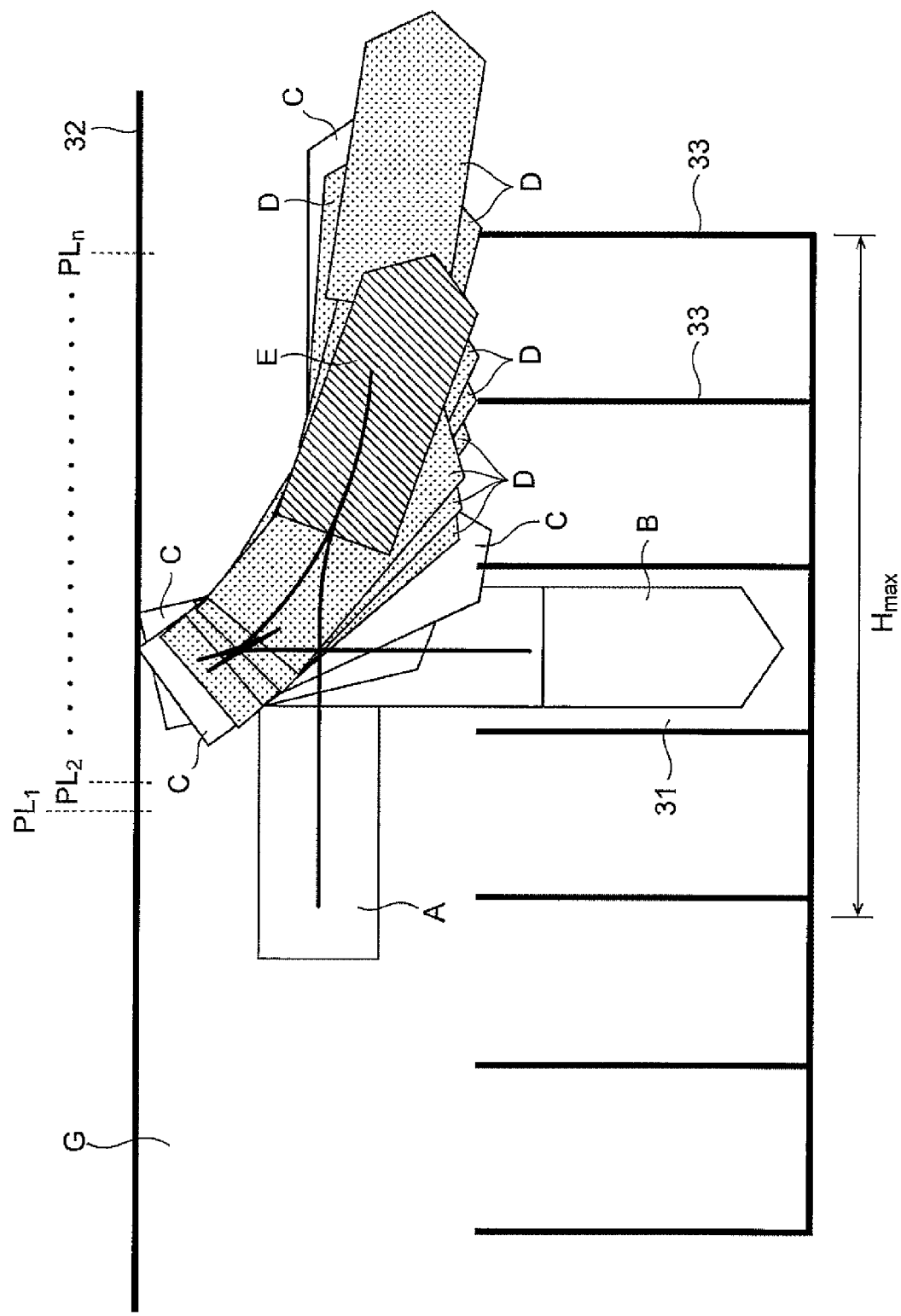
FIG. 5 is a diagram showing connection candidate positions on a backward-direction path in the case of forward parallel parking.

FIG. 5 is a diagram showing connection candidate positions on a backward-direction path in the case of forward parallel parking.

The connection candidate lines PL are set so as to extend in the direction of the width of the passage G in front of the target parking position B. In the present embodiment, the connection candidate lines PL are set at intervals of 0.5 m along the passage G. In addition, information on the positions at which the reference point 22 passes through the connection candidate lines PL on the backward-direction path, and on the directions of the own vehicle at the positions is stored as a connection candidate position D.

Figure 6:
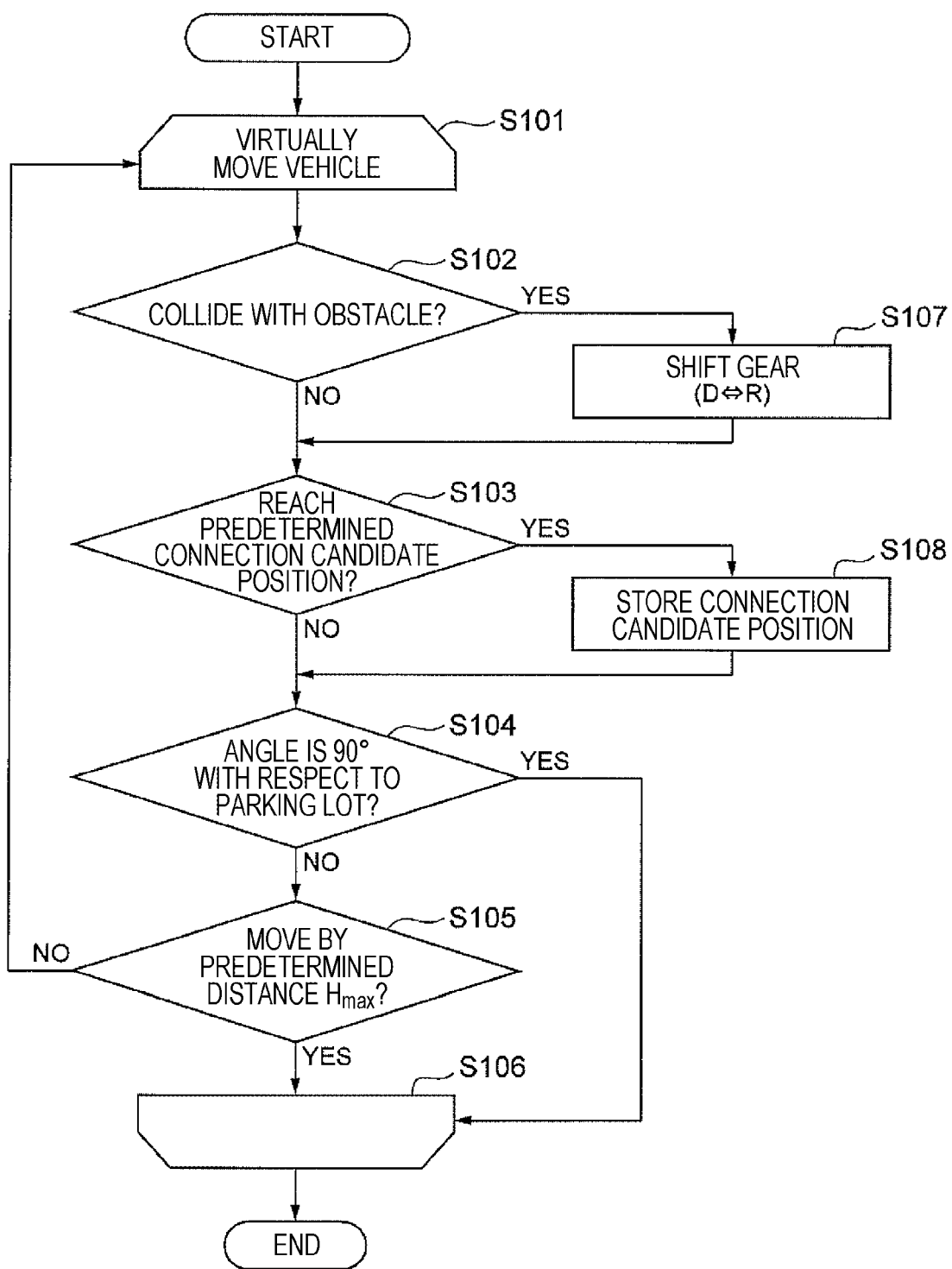
FIG. 6 is a flowchart explaining a method for calculating connection candidate positions on a backward-direction path.

FIG. 6 is a flowchart explaining a method for calculating connection candidate positions on a backward-direction path.

First, in accordance with a predetermined rule, calculation for virtually moving the own vehicle 21 in the direction for taking the own vehicle 21 out from the target parking position is performed (S101), and whether the own vehicle 21 collides with an obstacle is determined (S102). When it is determined that the own vehicle 21 collides with the obstacle, a position separated by a predetermined gap in front of the collision position is determined as the reachable limit position C, and the gear is shifted so as to switch from moving forward to moving backward or from moving backward to moving forward (S107).

Then, whether the own vehicle 21 reaches the predetermined connection candidate position D is determined (S103), it is determined that the own vehicle 21 reaches the predetermined connection candidate position D when the reference point 22 of the own vehicle 21 passes through the connection candidate line PL, and the information on the position at that time and on the direction of the own vehicle 21 at the position is stored (S108). Then, whether the angle of the own vehicle is 90 degrees with respect to the parking frame, which is the first condition, is determined (S104), it is determined that the first condition is satisfied when the angle is 90 degrees, and the routine is terminated.

On the other hand, when the direction of the own vehicle 21 is not 90 degrees, whether the own vehicle 21 is separated by the predetermined distance Hmax or more is determined (S105). In the present embodiment, the predetermined distance Hmax is set to 7 m. It is determined that the second condition is satisfied when the own vehicle 21 is separated by the predetermined distance Hmax or more, and the routine is terminated.

<Forward-Direction-Path Calculation Unit>

The forward-direction-path calculation unit 13 calculates a forward-direction path that can lead to one of the plurality of connection candidate positions D from the current position A of the own vehicle 21. The forward-direction path is a path that can lead to a connection candidate position D from the current position of the own vehicle 21 by either moving forward or backward without switching moving forward and backward. Such calculation is performed based on the own-vehicle position information and the specification information of the own vehicle, and the forward-direction path is sequentially calculated from a connection candidate position that can be reached with a smaller number of turns and is closer to the current position of the own vehicle. Then, a connection candidate position D that can be reached from the current position of the own vehicle and closest to the own vehicle is selected, the connection candidate position D is set as the reaching position E, and a forward-direction path from the current position A is calculated.

If the own vehicle 21 can be arranged in a predetermined direction at a connection candidate position on the backward-direction path from the current position, the own vehicle 21 can be moved to the target parking position only by following the backward-direction path in the backward direction. Thus, the forward-direction-path calculation unit 13 selects, from a plurality of connection candidate positions on the backward-direction path, a connection candidate position at which the vehicle can be arranged in a predetermined direction from the current position. Then, in order to shorten the time required for parking as short as possible, a connection candidate position having a short moving distance from the current position is selected.

Figure 7:
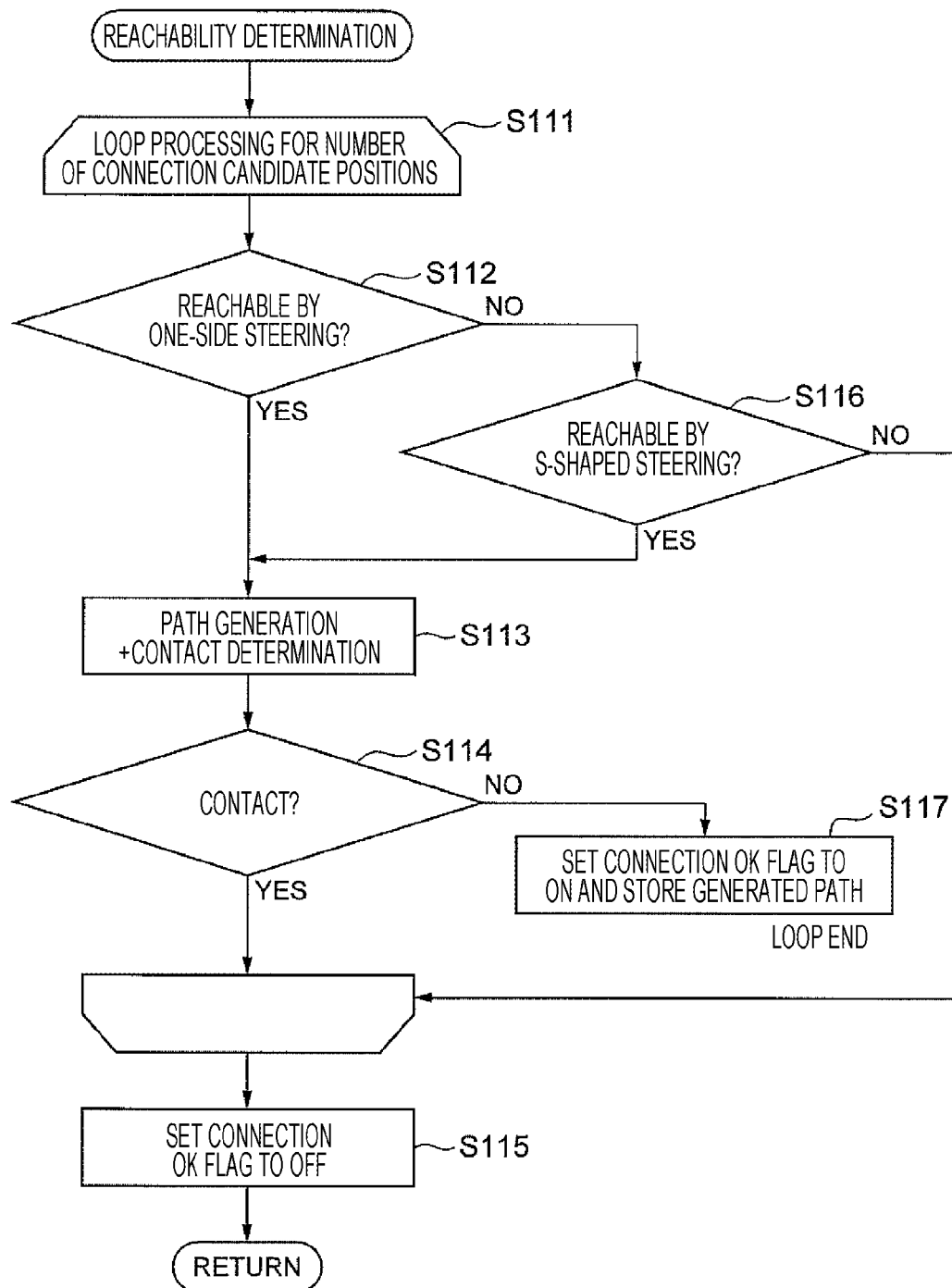
FIG. 7 is a processing flow of reachability determination.

FIG. 7 is a processing flow of reachability determination.

This processing flow is looped for the number of connection candidate positions (S111), and, first, whether the own vehicle 21 can reach the connection candidate position by one-side steering (S112). The one-side steering is an operation of steering the steering wheel to either one of the left or right side. Then, when it is determined that the own vehicle 21 cannot reach the connection candidate position by the one-side steering, whether the own vehicle 21 reach the connection candidate position by S-shaped steering (S116). The S-shaped steering is an operation of steering the steering wheel to both of the left and right sides.

Then, when it is determined that the own vehicle 21 can reach the connection candidate position D by the one-side steering or S-shaped steering, the connection candidate position D is selected as the reaching position E, and a forward-direction path from the current position of the own vehicle 21 to the reaching position E is generated (S113).

Then, whether the own vehicle 21 contacts with an obstacle on the forward-direction path is determined (S114), when it is determined that the own vehicle 21 does contact, a connection OK flag is set to ON, the generated forward-direction path is stored, and the loop is terminated (S117). On the other hand, when it is determined that the own vehicle 21 cannot reach the connection candidate position by the one-side steering or S-shaped steering (NO in S112 and S116), or when it is determined that the own vehicle 21 contacts in the contact determination (YES in S114), the determination on the connection candidate position D is terminated, and determination for the remaining connection candidate positions is performed. When it is determined that the own vehicle 21 cannot reach all of the connection candidate positions D, the connection OK flag is set to OFF (S115), and the processing flow is terminated.

Figure 8A:
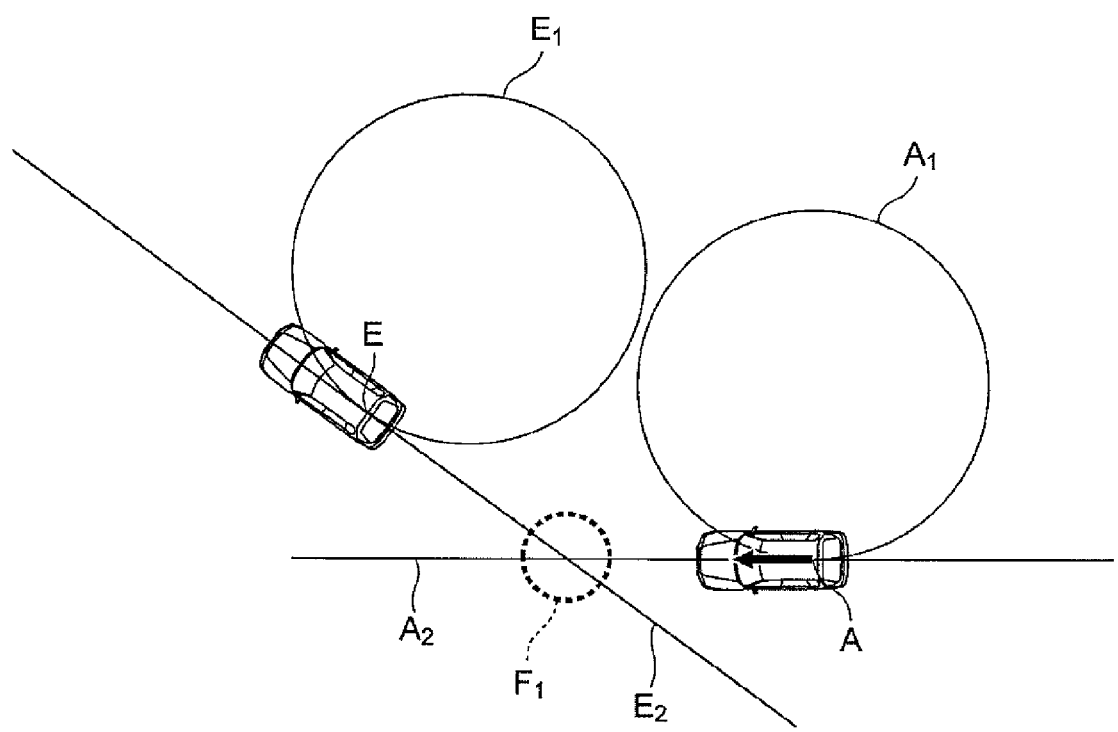
FIG. 8A is a diagram explaining an example of reachability determination by one-side steering.
Figure 8B:
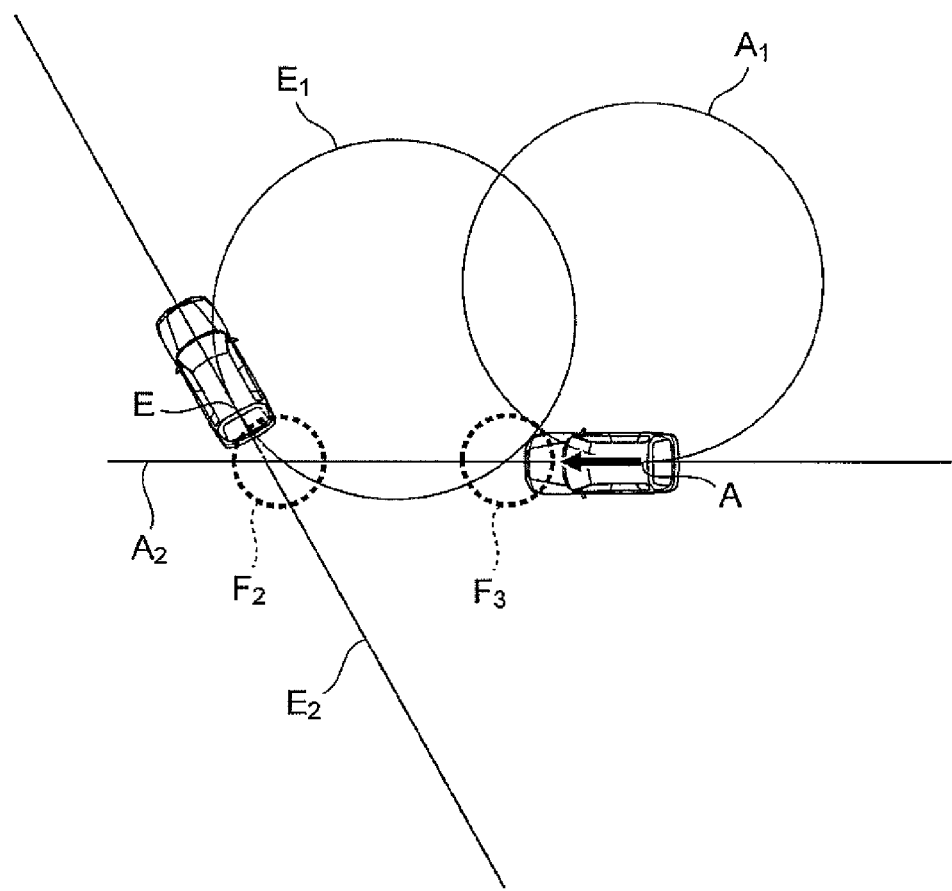
FIG. 8B is a diagram explaining an example of reachability determination by one-side steering.
Figure 8C:
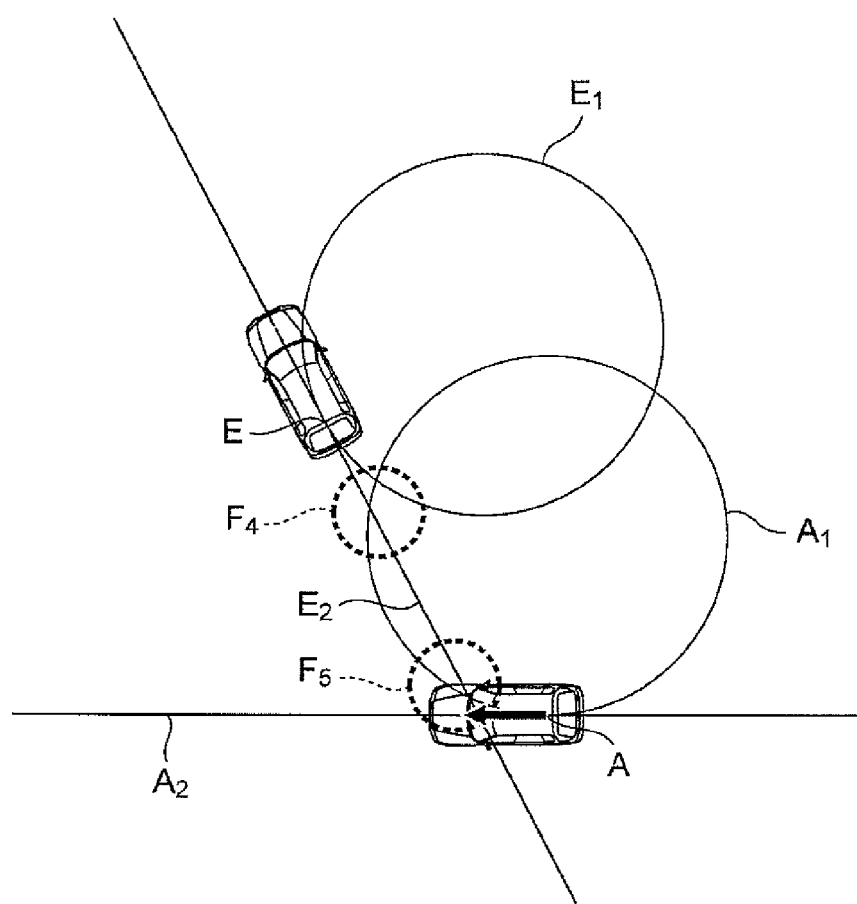
FIG. 8C is a diagram explaining an example of reachability determination by one-side steering.
Figure 8D:
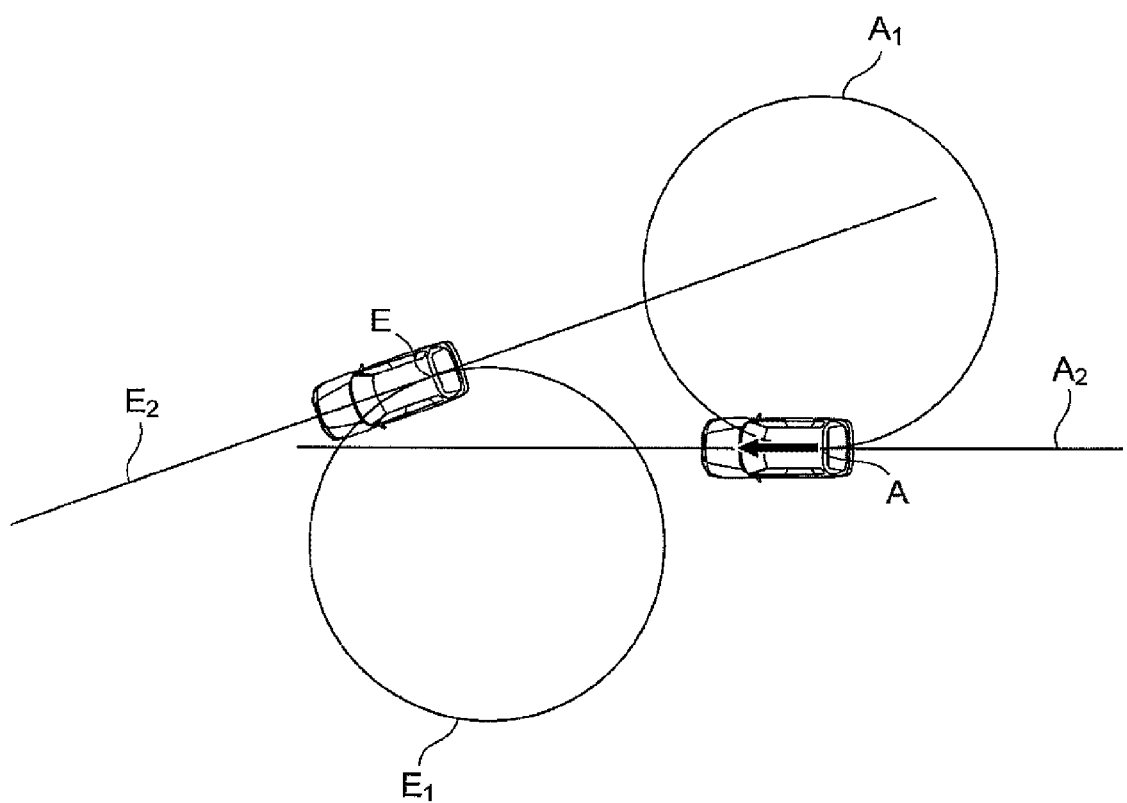
FIG. 8D is a diagram explaining an example of reachability determination by S-shaped steering.
Figure 8E:
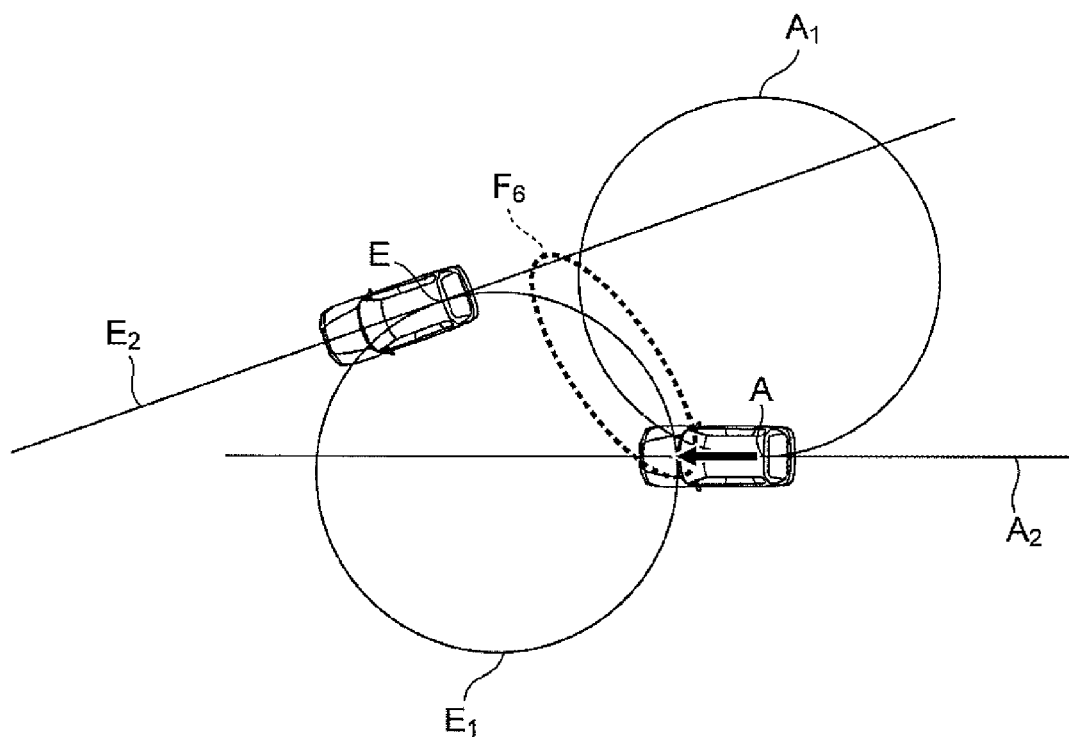
FIG. 8E is a diagram explaining an example of reachability determination by S-shaped steering.

FIGS. 8A to 8C are diagrams explaining an example of reachability determination by one-side steering, and FIGS. 8D and 8E are diagrams for explaining an example of reachability determination by S-shaped steering.

In the reachability determination by one-side steering in S112, it is determined that the own vehicle 21 can reach the connection candidate position when all the following conditions (a1) to (a3) are satisfied (the angular difference and position are also restricted).

(a1) An axis line A2 at the current position A of the own vehicle 21 and an axis line E2 at the reaching position E cross.

(a2) A turning circle A1 at the current position A and the axis line E2 at the reaching position E do not cross.

(a3) A turning circle E1 at the reaching position E and the axis line A2 at the current position A do not cross.

The turning circle is assumed to be a circular arc (minimum rotation locus) on the turning side taking the clothoid into consideration.

In the example shown in FIG. 8A, since the axis lines A2 and E2 cross at a crossing position F1, the above condition (a1) is satisfied. Thus, it is determined that the own vehicle 21 can reach the connection candidate position by one-side steering. On the other hand, in FIG. 8B, since the turning circle E1 and the axis line A2 at the current position cross, the above condition (a3) is not satisfied. In the example shown in FIG. 8C, since the turning circle A1 at the current position and the axis line E2 at the reaching position E cross, the above condition (a2) is not satisfied. Thus, in the example shown in FIGS. 8B and 8C, it is determined that the own vehicle 21 cannot reach the connection candidate position by one-side steering, and the determination as to whether S-shaped steering is possible is performed.

In the reachability determination by S-shaped steering in S116, it is determined that the own vehicle 21 can reach the connection candidate position when the following condition (a4) is satisfied (the angular difference and position are also restricted).

(a4) The turning circle A1 at the current position A and the turning circle E1 at the reaching position E do not cross.

In the example shown in FIG. 8D, since the turning circle A1 and the turning circle E1 do not cross, the condition is satisfied. Thus, it is determined that the own vehicle 21 can reach the connection candidate position by S-shaped steering. On the other hand, in the example shown in FIG. 8E, since the turning circle A1 and the turning circle E1 cross, the condition is not satisfied, and it is determined that the own vehicle 21 cannot reach the connection candidate position by S-shaped turning.

Figure 9:
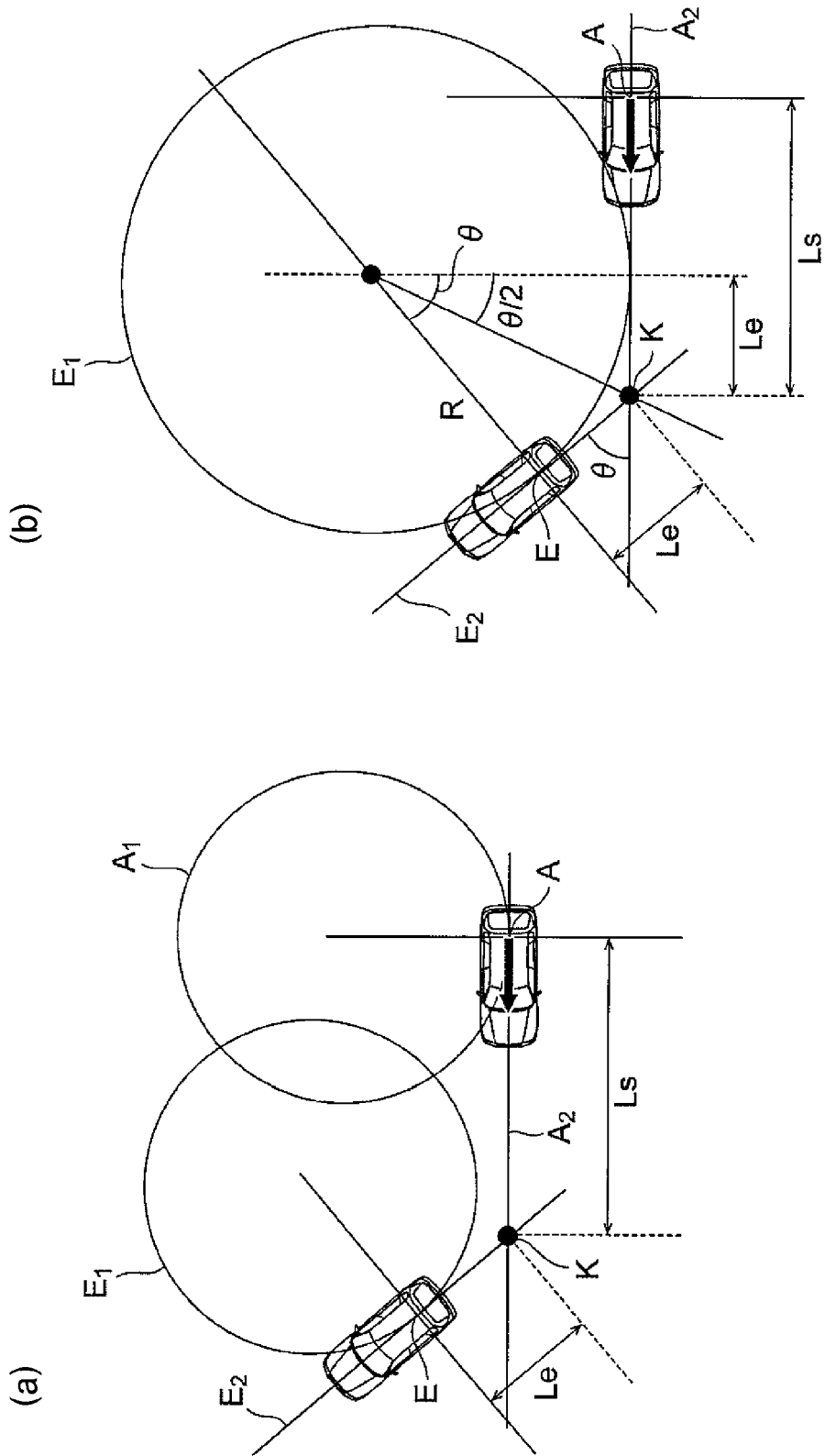
FIG. 9 is a diagram explaining a method for generating a forward-direction path by one-side steering.

FIG. 9 is a diagram explaining a method for generating a forward-direction path by one-side steering.

In order to generate a path by one-side steering from the current position A to the reaching position E, first, as shown in FIG. 9($a$), a distance Ls between a crossing K of the axis lines A2 and E2 and the current position A, and a distance Le between the crossing K and the reaching position E are calculated, and the shorter distance is selected (in the example shown in the drawing, the distance Le is selected). Then, as shown in FIG. 9($b$), a circle having two axis lines A2 and E2 as common tangents and passing through a position separated by the shorter distance from the crossing K is drawn, and the radius R is calculated with the following expression (1) from the geometric calculation.

[Expression 1]

$$R = \frac{L_c}{\tan\frac{\theta}{2}} \quad (1)$$

In this manner, it is possible to generate a forward-direction path combining a straight line and an arc.

Figure 10:
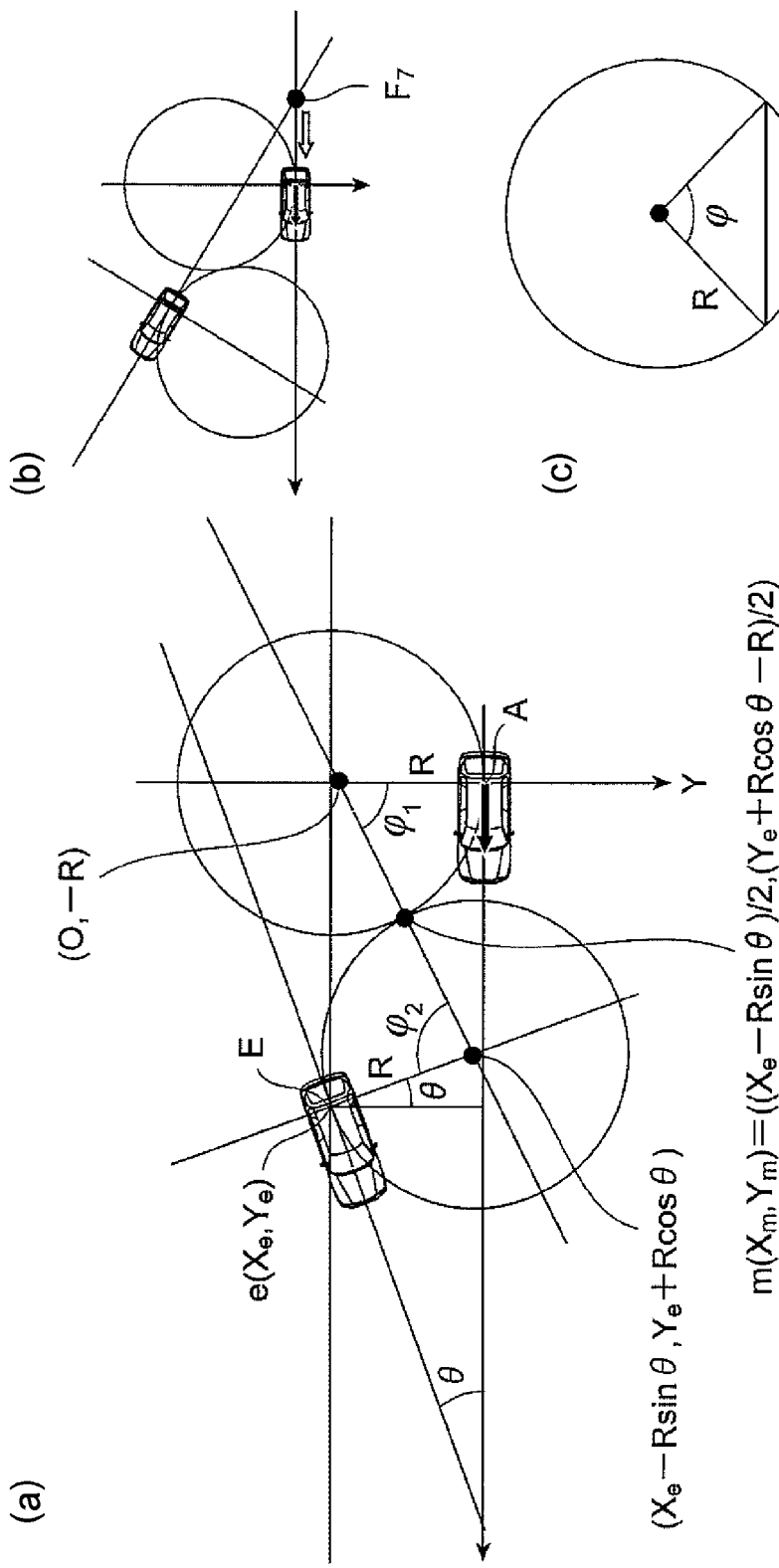
FIG. 10 is a diagram explaining a method for generating a forward-direction path by S-shaped steering.

FIG. 10 is a diagram explaining a method for generating a forward-direction path by S-shaped steering, and is a diagram explaining a generation method when the axis line E2 does not cross with the X axis, which is the axis line E2 at the current position A, behind the reaching position E.

Here, the radius R of common circles having the same radius is calculated to draw an S-shape. As long as a contact point of the circle is obtained, an S-shaped forward-direction path can be generated by combining the arc of the turning circle A1 and the arc of the turning circle E1.

The radius of the common circle is obtained from the distance between the center coordinates since the center coordinates of the circles are obtained.

[Expression 2]

$$2R = \sqrt{(X_e - R\sin\theta)^2 + (Y_e + R\cos\theta + R)^2} \quad (2)$$

[Expression 3]

$$R = \frac{X_e\sin\theta - Y_e(1 + \cos\theta) - \sqrt{\{X_e\sin\theta - Y_e(1 + \cos\theta)\}^2 - 2(\cos\theta - 1)(X_e^2 + Y_e^2)}}{2(\cos\theta - 1)} \quad (3)$$

However, when $\theta=0$,

[Expression 4]

$$R = -\frac{X_e^2 + Y_e^2}{4Y_e} \quad (4)$$

From the state shown in FIG. 10(*a*) to the position of the crossing F7 shown in FIG. 10(*b*) can be calculated by the above expressions.

The turning angles $\varphi_1$, and $\varphi_2$ of the S shape are calculated with the formula shown in FIG. 10(*c*) and the arc lengths $b_1$, and $b_2$ are calculated with the following expressions.

[Expression 5]

$$\varphi_1 = 2\sin^{-1}\left(\frac{\sqrt{X_m^2 + Y_m^2}}{2R}\right) \quad (5)$$

[Expression 6]

$$b_1 = 2R\sin^{-1}\left(\frac{\sqrt{X_m^2 + Y_m^2}}{2R}\right) \quad (6)$$

[Expression 7]

$$\varphi_2 = 2\sin^{-1}\left(\frac{\sqrt{(X_m - X_e)^2 + (Y_m - Y_e)^2}}{2R}\right) \quad (7)$$

[Expression 8]

$$b_2 = 2R\sin^{-1}\left(\frac{\sqrt{(X_m - X_e)^2 + (Y_m - Y_e)^2}}{2R}\right) \quad (8)$$

Figure 11:
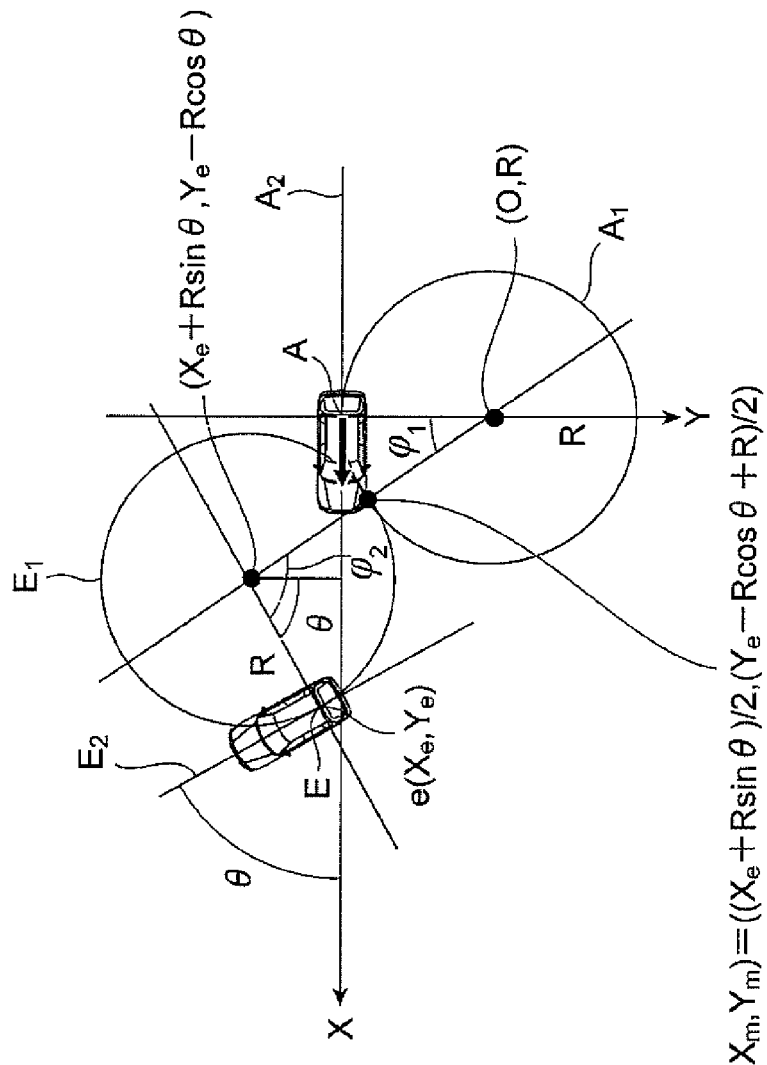
FIG. 11 is a diagram explaining a method for generating a forward-direction path by S-shaped steering.

FIG. 11 is a diagram explaining a method for generating a forward-direction path by S-shaped steering, and is a diagram explaining a generation method when the axis line E2 crosses with the X axis, which is the axis line A2 at the current position A, behind the reaching position E.

Here, the radius R of the common turning circles E1 and A1 having the same radius is calculated to draw an S shape. Then, as long as a contact point of the circle is obtained, an S-shaped forward-direction path can be generated by combining the arc of the turning circle A1 and the arc of the turning circle E1.

The radius of the common circle is obtained from the distance between the center coordinates since the center coordinates of the circles are obtained.

[Expression 9]

$$2R = \sqrt{(X_e - R\sin\theta)^2 + (Y_e - R\cos\theta - R)^2} \quad (9)$$

[Expression 10]

$$R = \frac{-\{X_e\sin\theta - Y_e(1 + \cos\theta)\} - \sqrt{\{X_e\sin\theta - Y_e(1 + \cos\theta)\}^2 - 2(\cos\theta - 1)(X_e^2 + Y_e^2)}}{2(\cos\theta - 1)} \quad (10)$$

The turning angles $\varphi_1$, and $\varphi_2$ of the S shape are calculated with the formula shown in FIG. 10(*c*) and the arc lengths $b_1$, and $b_2$ are calculated with the following expressions.

[Expression 11]

$$\varphi_1 = 2\sin^{-1}\left(\frac{\sqrt{X_m^2 + Y_m^2}}{2R}\right) \quad (11)$$

[Expression 12]

$$b_1 = 2R\sin^{-1}\left(\frac{\sqrt{X_m^2 + Y_m^2}}{2R}\right) \quad (12)$$

[Expression 13]

$$\varphi_2 = 2\sin^{-1}\left(\frac{\sqrt{(X_m - X_e)^2 + (Y_m - Y_e)^2}}{2R}\right) \quad (13)$$

[Expression 14]

$$b_2 = 2R\sin^{-1}\left(\frac{\sqrt{(X_m - X_e)^2 + (Y_m - Y_e)^2}}{2R}\right) \quad (14)$$

Figure 12:
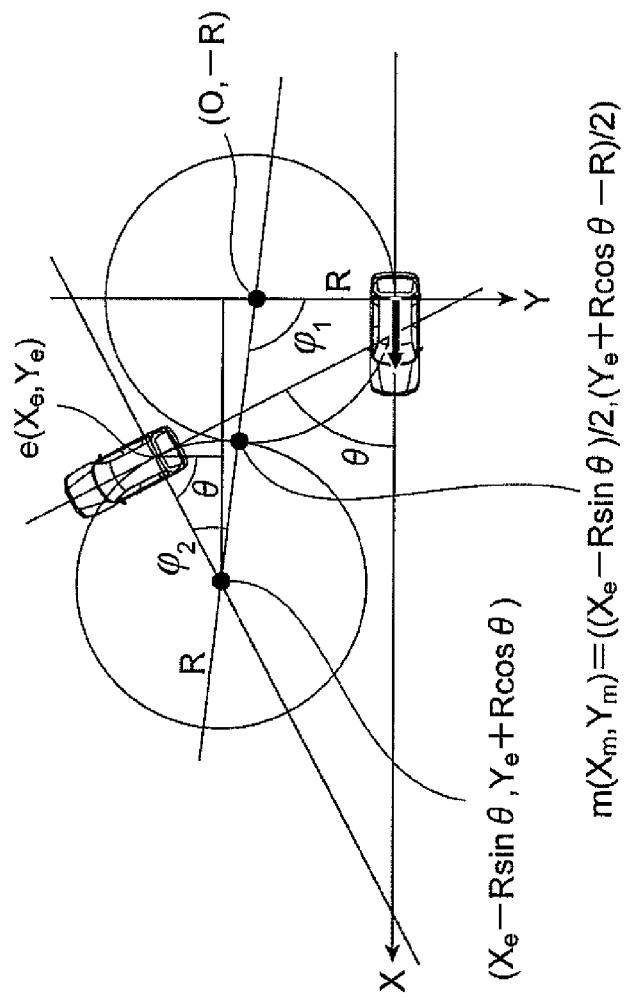
FIG. 12 is a diagram explaining a method for generating a forward-direction path by S-shaped steering.

FIG. 12 is a diagram explaining a method for generating a forward-direction path by S-shaped steering, and is a diagram explaining a generation method when the axis line E2 crosses with the X axis, which is the axis line A2 at the current position A, behind the reaching position E.

Here, the radius R of the common circles E1 and A1 having the same radius is calculated to draw an S shape. Then, as long as a contact point of the circle is obtained, an S-shaped forward-direction path can be generated by combining the arc of the turning circle A1 and the arc of the turning circle E1.

The radius of the common circle is obtained from the distance between the center coordinates since the center coordinates of the circles are obtained.

[Expression 15]

$$2R = \sqrt{(X_e - R\sin\theta)^2 + (Y_e + R\cos\theta + R)^2} \quad (15)$$

[Expression 16]

$$R = \frac{X_e\sin\theta - Y_e(1 + \cos\theta) - \sqrt{\{X_e\sin\theta - Y_e(1 + \cos\theta)\}^2 - 2(\cos\theta - 1)(X_e^2 + Y_e^2)}}{2(\cos\theta - 1)} \quad (16)$$

The turning angles $\varphi_1$, and $\varphi_2$ of the S shape are calculated with the formula shown in FIG. 10(*c*) and the arc lengths $b_1$, and $b_2$ are calculated with the following expressions.

[Expression 17]

$$\varphi_1 = 2\sin^{-1}\left(\frac{\sqrt{X_m^2 + Y_m^2}}{2R}\right) \quad (17)$$

[Expression 18]

$$b_1 = 2R\sin^{-1}\left(\frac{\sqrt{X_m^2 + Y_m^2}}{2R}\right) \quad (18)$$

[Expression 19]

$$\varphi_2 = 2\sin^{-1}\left(\frac{\sqrt{(X_m - X_e)^2 + (Y_m - Y_e)^2}}{2R}\right) \quad (19)$$

[Expression 20]

$$b_2 = 2R\sin^{-1}\left(\frac{\sqrt{(X_m - X_e)^2 + (Y_m - Y_e)^2}}{2R}\right) \quad (20)$$

<Parking-Path Setting Unit>

The parking-path setting unit 14 sets a parking path using the information on the backward-direction path from the target parking position to the connection candidate position selected by the forward-direction-path calculation unit 13 and the information on the forward-direction path from the own-vehicle position information to the connection candidate position.

According to the present invention, since a backward-direction path is calculated from a target parking position B, the closest connection candidate which is reachable from a current position A of an own vehicle is selected among a plurality of connection candidate positions D set on the backward-direction path as a reaching position E, and a parking path is set using the backward-direction path from the target parking position B to the reaching position E and a forward-direction path from the current position A of the own vehicle to the reaching position E, it is possible to calculate the parking path including turns for guiding the own vehicle 21 to the target parking position B without depending on an initial position at which parking assist is started and on a vehicle posture, and to park the own vehicle 21 at a parking position desired by a driver with a proper vehicle posture.

The embodiment of the present invention has been described in detail, but the present invention is not limited to the above embodiment, and designs can be variously changed without departing from the spirit of the present invention described in the claims. For example, the above embodiment has been described in detail in order for the present invention to be easily understood, and is not necessarily limited to those having all the described configurations. Furthermore, a part of the configuration of an embodiment can be replaced with the configuration of another embodiment, and the configuration of an embodiment can be added to the configuration of another embodiment. Moreover, other configurations can be added, deleted, or replaced with respect to a part of the configuration of each embodiment.

REFERENCE SIGNS LIST

1 Parking assist device
11 Backward-direction-path calculation unit
12 Connection-candidate-position storage unit
13 Forward-direction-path calculation unit
14 Parking-path setting unit
15 Operation input unit
16 Path display unit
21 Own vehicle
22 Reference point
31 Parking frame
32, 33 Obstacle
A Current position
B Target parking position
C Reachable limit position
D Connection candidate position
E Reaching position
G Passage
PLn Connection candidate line

The invention claimed is:

1. A parking assist device that calculates a parking path from a current position of an own vehicle to a target parking position, the parking assist device comprising:
   a sensor;
   an input; and
   a processor that is communicatively coupled to the sensor and the input, wherein the processor is configured to:
   determine, using the sensor, the current position of the own vehicle;
   receive, using the input, the target parking position;
   calculate a backward-direction path for taking the own vehicle out from the target parking position based on constraint conditions of a parking space and an own-vehicle behavior and a number of turns of the own vehicle;
   set a plurality of connection candidate positions on the backward-direction path;
   sequentially calculate paths respectively leading to the plurality of connection candidate positions from the current position of the own vehicle based on the number of turns of the own vehicle and the current position of the own vehicle;
   select a connection candidate position to which a path having a shortest moving distance from the current position of the own vehicle leads;
   determine whether the own vehicle collides with an obstacle;
   change a gear of the own vehicle to change a moving direction of the own vehicle between a forward direction of the own vehicle and a backward direction;
   determine the path leading to the selected connection candidate position as a forward-direction path; and
   set the parking path by combining the backward-direction path and the forward-direction path such that a steering direction of the own vehicle is changed.

2. The parking assist device according to claim 1, wherein the processor is further configured to:
   determine whether the own vehicle can reach each of the connection candidate positions from the current position of the own vehicle by one-side steering or by S-shaped steering; and
   select the connection candidate position by determining that the own vehicle can reach the connection candidate position from the current position of the own vehicle by one-side steering or by S-shaped steering.

3. The parking assist device according to claim 1, wherein the processor is further configured to:
   calculate, in a case of backward parallel parking, the forward path for the own vehicle to reach a reachable limit position with respect to a front obstacle by steering to either the left or the right and moving forward, and a backward path for the own vehicle to reach a reachable limit position with respect to a rear obstacle by straightening the front wheels with respect to the own vehicle and moving backward.

4. The parking assist device according to claim 1, wherein the processor is further configured to:
   calculate, in a case of forward parallel parking, a backward path for the own vehicle to reach a reachable limit position with respect to a rear obstacle by steering to either the left or the right and moving backward, and a forward path for the own vehicle to reach a reachable limit position with respect to a front obstacle by straightening the front wheels with respect to the own vehicle and moving forward.

5. The parking assist device according to claim 1, wherein the processor is further configured to:
   determine whether the own vehicle can reach each of the connection candidate positions from the current position of the own vehicle by one-side steering;
   select the connection candidate position by determining that the own vehicle can reach the connection candidate position from the current position of the own vehicle by one-side steering; and
   select the connection candidate position when an axis line of the own vehicle at the current position of the own vehicle and the axis line of the own vehicle at a reaching position after taking out from the target parking position cross, a turning circle at the current position and the axis line at the reaching position do not cross, and the axis line at the current position and a turning circle at the reaching position do not cross, the axis line of the own vehicle passing at an center of the own vehicle and extending in a longitudinal direction of the own vehicle.

* * * * *